United States Patent
Tao et al.

(10) Patent No.: US 11,465,368 B2
(45) Date of Patent: Oct. 11, 2022

(54) JOINING CARBON LAMINATES USING PULSED LASER IRRADIATION

(71) Applicants: KING ABDULLAH UNIVERSITY OF SCIENCE AND TECHNOLOGY, Thuwal (SA); UNIVERSITÁ DELLA CALABRIA, Arcavacata di Rende (IT)

(72) Inventors: Ran Tao, Thuwal (SA); Marco Alfano, Rende (IT); Gilles Lubineau, Thuwal (SA)

(73) Assignees: KING ABDULLAH UNIVERSITY OF SCIENCE AND TECHNOLOGY, Thuwal (SA); UNIVERSITÁ DELLA CALABRIA, Arcavacata di Rende (IT)

( * ) Notice: Subject to any disclaimer, the term of this patent is extended or adjusted under 35 U.S.C. 154(b) by 0 days.

(21) Appl. No.: 16/753,542

(22) PCT Filed: Oct. 3, 2018

(86) PCT No.: PCT/IB2018/057704
§ 371 (c)(1),
(2) Date: Apr. 3, 2020

(87) PCT Pub. No.: WO2019/073342
PCT Pub. Date: Apr. 18, 2019

(65) Prior Publication Data
US 2020/0290293 A1 Sep. 17, 2020

Related U.S. Application Data

(60) Provisional application No. 62/646,601, filed on Mar. 22, 2018, provisional application No. 62/571,342, filed on Oct. 12, 2017.

(51) Int. Cl.
*B29C 65/00* (2006.01)
*B23K 26/00* (2014.01)
(Continued)

(52) U.S. Cl.
CPC ........ *B29C 66/0246* (2013.01); *B23K 26/364* (2015.10); *B23K 26/402* (2013.01);
(Continued)

(58) Field of Classification Search
CPC ......... B29C 65/00; B29C 65/40; B29C 65/48; B29C 66/00; B29C 66/02; B29C 66/024;
(Continued)

(56) References Cited

U.S. PATENT DOCUMENTS

2011/0086204 A1* 4/2011 Wohl, Jr. ............... G02B 1/12
219/121.72
2015/0367538 A1* 12/2015 Mochizuki .......... B29C 66/7392
428/167

(Continued)

OTHER PUBLICATIONS

Almuhammadi, K., et al., "Laser-Based Surface Preparation of Composite Laminates Leads to Improved Electrodes for Electrical Measurements," Applied Surface Science, Oct. 19, 2015, vol. 359, pp. 388-397, Elsevier.
(Continued)

*Primary Examiner* — Jacob T Minskey
*Assistant Examiner* — Matthew Hoover
(74) *Attorney, Agent, or Firm* — Patent Portfolio Builders PLLC

(57) ABSTRACT

A method for bonding two elements, the method including receiving first and second elements, the first element being a composite material; applying a laser-based treatment to a surface of the first element to obtain a treated surface; patterning the treated surface to have plural trenches; applying an adhesive to one of the first and second elements; and joining the first element to the second element so that the adhesive is between the first and second elements.

13 Claims, 14 Drawing Sheets

(51) Int. Cl.
| | |
|---|---|
| B32B 3/00 | (2006.01) |
| B32B 5/00 | (2006.01) |
| B32B 7/00 | (2019.01) |
| B23K 26/364 | (2014.01) |
| B23K 26/402 | (2014.01) |
| B29C 65/48 | (2006.01) |
| B32B 3/30 | (2006.01) |
| B32B 5/02 | (2006.01) |
| B32B 7/12 | (2006.01) |
| B23K 103/16 | (2006.01) |
| B29K 63/00 | (2006.01) |
| B29K 307/04 | (2006.01) |
| B29L 31/30 | (2006.01) |

(52) U.S. Cl.
CPC ............ *B29C 65/48* (2013.01); *B29C 66/232* (2013.01); *B29C 66/30325* (2013.01); *B29C 66/7212* (2013.01); *B32B 3/30* (2013.01); *B32B 5/02* (2013.01); *B32B 7/12* (2013.01); *B23K 2103/16* (2018.08); *B29K 2063/00* (2013.01); *B29K 2307/04* (2013.01); *B29L 2031/3076* (2013.01); *B32B 2255/02* (2013.01); *B32B 2255/26* (2013.01); *B32B 2262/106* (2013.01); *B32B 2605/18* (2013.01)

(58) Field of Classification Search
CPC ..... B29C 66/0246; B29C 66/20; B29C 66/23; B29C 66/232; B29C 66/30; B29C 66/303; B29C 66/3032; B29C 66/30325; B29C 66/70; B29C 66/72; B29C 66/721; B29C 66/7212; B23K 26/00; B23K 26/30; B23K 26/36; B23K 26/364; B32B 3/00; B32B 3/30; B32B 5/00; B32B 5/02; B32B 7/00; B32B 7/10; B32B 7/12
See application file for complete search history.

(56) References Cited

U.S. PATENT DOCUMENTS

| | | | |
|---|---|---|---|
| 2016/0265570 A1* | 9/2016 | Sabau | ......................... C09J 5/02 |
| 2017/0015047 A1 | 1/2017 | Mochizuki | |

OTHER PUBLICATIONS

ASTM International, "Standard Test Method for Mode I Interlaminar Fracture Toughness of Unidirectional Fiber-Reinforced Polymer Matrix Composites 1," Designation: D5528-13, Mar. 2019, 13 pages.

Balart, J., et al., "Improvement of Adhesion Properties of Polypropylene Substrates by Methyl Methacrylate UV Photografting Surface Treatment," Materials and Design, Jul. 11, 2011, vol. 33, pp. 1-10, Elsevier.

Bérnard, Q., et al., "Peel Ply Surface Treatment for Composite Assemblies: Chemistry and Morphology Effects," Composites: Part A, Feb. 9, 2005, vol. 36, pp. 1562-1568, Elsevier.

Bérnard, Q., et al., "Surface Treatment of Carbon/Epoxy and Glass/Epoxy Composites with an Excimer Laser Beam," International Journal of Adhesion & Adhesives, 2006, vol. 26, pp. 543-549, Elsevier.

Fernandes, R.L., et al., "Effect of Moisture on Pure Mode I and II Fracture Behaviour of Composite Bonded Joints," International Journal of Adhesion & Adhesives, Feb. 2, 2016, vol. 68, pp. 30-38, Elsevier.

Fischer, F., et al., "Laser Surface Pre-Treatment of Carbon Fiber-Reinforced Plastics (CFRPs) for Adhesive Bonding," Laser Surface Modification and Adhesion, Oct. 2014, pp. 103-138, Scrivener Publishing LLC.

Galvez, P., et al., "Study of the Behaviour of Adhesive Joints of Steel with CFRP for its Application in Bus Structures," Composites Part B, Jul. 16, 2017, vol. 129, pp. 41-46, Elsevier.

Hartwig, A., et al., "Surface Treatment of an Epoxy Resin by CO2 Laser Irradiation," Die Angewandte Makromolekulare Chemie, Jun. 1996, vol. 238, pp. 177-189, Hüthig & Wepf Verlag, Zug.

Hernandez, E., et al., "Improving Adhesion of Copper/Epoxy Joints by Pulsed Laser Ablation," International Journal of Adhesion & Adhesives, Jan. 2016, vol. 64, pp. 23-32, Elsevier.

Heshmati, M., et al., "Environmental Durability of Adhesively Bonded FRP/Steel Joints in Civil Engineering Applications: State of the Art," Composites Part B, Aug. 4, 2015, vol. 81, pp. 259-275, Elsevier.

Holtmannspötter, et al., "The Use of Peel Ply as a Method to Create Reproduceable but Contaminated Surfaces for Structural Adhesive Bonding of Carbon Fiber Reinforced Plastics," The Journal of Adhesion, Nov. 26, 2012, vol. 89, pp. 96-110.

International Search Report in corresponding/related International Application No. PCT/IB2018/057704, dated Dec. 21, 2018.

Jölly, I., et al., "Chemical Functionalization of Composite Surfaces for Improved Structural Bonded Repairs," Composites: Part B, Oct. 19, 2014, vol. 69, pp. 296-303, Elsevier.

Katnam, K.B., et al., "Bonded Repair of Composite Aircraft Structures: A Review of Scientific Challenges and Opportunities," Progress in Aerospace Sciences, Apr. 23, 2013, vol. 61, pp. 26-42, Elseiver.

Korayem, A.H., et al., "Effect of Carbon Nanotube Modified Epoxy Adhesive on CFRP-to-Steel Interface," Composites Part B, Mar. 24, 2015, vol. 79, pp. 95-104, Elsevier.

Korta, J., et al., "Experimental and Numerical Study on the Effect of Humidity-Temperature Cycling on Structural Multi-Material Adhesive Joints," Composites Part B, May 22, 2015, vol. 79, pp. 621-630, Elsevier.

Kreling, S. et al., "Analytical Characterization of CFRP Laser Treated by Excimer Laser Radiation," Physics Procedia, Apr. 2013, vol. 41, pp. 282-290, Elsevier.

Kruse, T., et al., "Bonding of CFRP Primary Aerospace Structures—Crackstopping in Composite Bonded Joints Under Fatigue," 20th International Conference on Composite Materials, Jul. 19-24, 2015, Copenhagen, 12 pages.

Lu, J.-H., et al., "Adhesive Bonding of Carbon Fiber Reinforced Composite Using UV-Curing Epoxy Resin," Composites Part B, Aug. 20, 2015, vol. 82, pp. 221-225, Elsevier.

Markatos, D.N., et al., "Degradation of Mode-I Fracture Toughness of DFRP Bonded Joints Due to Release Agent and Moisture Pre-Bond Contamination," The Journal of Adhesion, Feb. 27, 2013, vol. 90, pp. 156-173, Taylor & Francis.

Markatos, D.N., et al., "The Effects of Manufacturing-Induced and In-Service Related Bonding Quality Reduction on the Mode-I Fracture Toughness of Composite Bonded Joints for Aeronautical Use," Jun. 9, 2012, Composites: Part B, vol. 45, pp. 556-564, Elsevier.

Palmieri, F.L., et al., "Laser Ablation Surface Preparation for Adhesive Bonding of Carbon Fiber Reinforced Epoxy Composites," International Journal of Adhesion & Adhesives, Feb. 20, 2016, vol. 68, pp. 95-101, Elsevier.

Palmieri, F.L., et al., "Laser Surface Preparation of Epoxy Composites for Secondary Bonding: Optimization of Ablation Depth," May 18, 2015, Conference Paper presented at SAMPE Baltimore Conference and Exhibition; May 18, 2015-May 21, 2015; Baltimore, MD; United States, 13 pages.

Russell, J.D., "Composites Affordability Initiative: Transitioning Advanced Aerospace Technologies through Cost and Risk Reduction," The AMMTIAC Quarterly, Jan. 1, 2007, vol. 1, No. 3, pp. 1-6.

Schmid Fuertes, T.A., et al., "Bonding of CFRP Primary Aerospace Structures—Discussion of the Certification Boundary Conditions and Related Technology Fields Addressing the Needs for Development," Composite Interfaces, Oct. 2015, vol. 22, No. 8, pp. 795-808, Airbus Operations GmbH.

Serrano, J.S., et al., "New Approach to Surface Preparation for Adhesive Bonding of Aeronautical Composites: Atmospheric Pres-

(56) References Cited

OTHER PUBLICATIONS sure Plasma. Studies on the Pretreatment Lifetime and Durability of the Bondline," Composite Interfaces, Jul. 6, 2015, vol. 22, No. 8, pp. 731-742, Airbus Operations S.L.

Stefanov, T., et al., "Mechanical Bulk Properties and Fracture Toughness of Composite-to-Composite Joints of an Elastomer-Toughened Ethyl Cyanoacrylate Adhesive," International Journal of Adhesion & Adhesives, Mar. 4, 2016, vol. 68, pp. 142-155, Elsevier.

Written Opinion of the International Searching Authority in corresponding/related International Application No. PCT/IB2018/057704, dated Dec. 21, 2018.

Yavas, D., et al., "Utilization of Nanoindentation to Examine Bond Line Integrity in Adhesively Bonded Composite Structures," International Journal of Fracture, Nov. 15, 2016, Spring Science+Business Media Dordrecht.

Yokozeki, T., et al., "Evaluation of Adhesively Bonded Joint Strength of CFRP with Laser Treatment," Advanced Composite Materials, Jun. 2, 2015, Japan Society for the Composite Materials, Korean Society for Composite Materials and Taylor & Francis.

Zaldivar, R.J., et al., "Surface Preparation for Adhesive Bonding of Polycyanurate-Based Fiber-Reinforced Composites Using Atmospheric Plasma Treatment," Nov. 8, 2010, Journal of Applied Polymer Science, vol. 120, pp. 921-931, Wiley Periodicals, Inc.

Zaldivar, R.J., et al., "Effect of Processing Parameter Changes on the Adhesion of Plasma-treated Carbon Fiber Reinforced Epoxy Composites," Journal of Composite Materials, Jun. 2010, vol. 44, No. 12, pp. 1435-1453.

\* cited by examiner

FIG. 8A  FIG. 8B
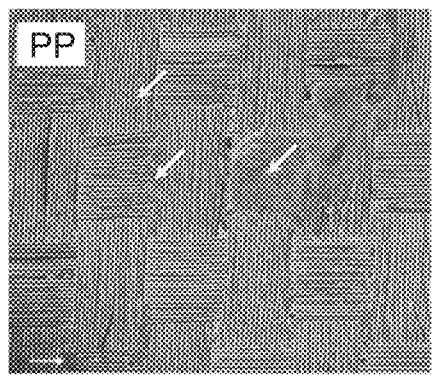 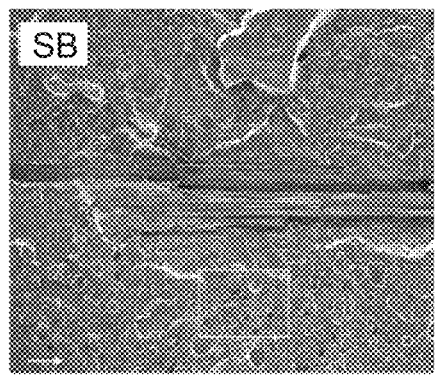
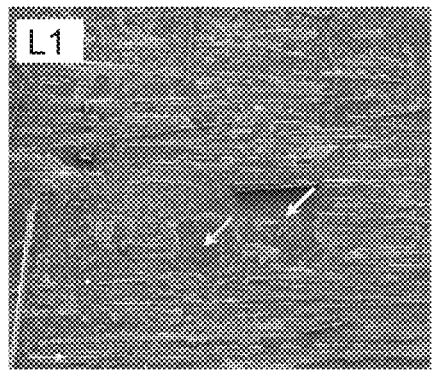 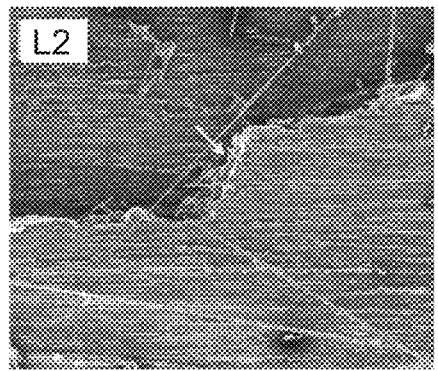
FIG. 8C  FIG. 8D

JOINING CARBON LAMINATES USING PULSED LASER IRRADIATION

CROSS REFERENCE TO RELATED APPLICATIONS

This application is a U.S. National Stage Application of International Application No. PCT/IB2018/057704, filed on Oct. 3, 2018, which claims priority to U.S. Provisional Patent Application No. 62/571,342, filed on Oct. 12, 2017, entitled "TUNING THE BRIDGING EFFECT OF CFRP LAMINATES USING PULSED LASER IRRADIATION," and U.S. Provisional Patent Application No. 62/646,601, filed on Mar. 22, 2018, entitled "JOINING CARBON LAMINATES USING PULSED LASER IRRADIATION," the disclosure of which are incorporated herein by reference in their entirety.

BACKGROUND

Technical Field

Embodiments of the subject matter disclosed herein generally relate to methods and devices for adhesively bonding composite materials, and more specifically, to methods and systems for increasing a fracture toughness of joined composite materials, above a prediction of the law of mixture.

Discussion of the Background

Lightweight materials play a very important role in the aerospace industry. Several large-scale aviation structures (e.g., fuselages, wings, fan blades, and tail cones) are today made up of carbon fiber-reinforced polymers (CFRPs). The key to affordability of the composite structures is reducing assembly costs. However, joining two or more components together during the process of manufacturing the airplane structures noted above remains a major cost due to the different properties of CFRPs with respect to their counterparts metallic materials.

Traditional mechanical fastening means, e.g., rivets or bolts, have several shortcomings. The hole-locating, drilling, and fastener installation processes are among the main labor-intensive activities in aircraft construction and rework. In addition, the rivets and bolts add significantly to the total structural weight of the components.

However, recent developments in structural adhesive technologies and surface preparation techniques make the adhesive bonding process a good candidate for replacing the traditional riveting and bolting in the bonding of the cured composites. The use of adhesives instead of rivets and bolts has been shown to reduce structural weight, facilitate a wide range of material combinations, and provide uniform stress distribution, thereby reducing the risk of fatigue failure.

The major concern which arises in adhesive bonding of composite materials is the requirement of suitable surface pretreatments, which should be able to prevent the adverse effect of surface contaminants and favor the adhesion at the adhesive/CFRP interface. Efficient surface pretreatments should enhance the strength and fracture toughness of the composite joints by promoting chemical bonding (e.g., physical adsorption, covalent bonding) and mechanical interlocking.

Common pretreatments include mechanical sandblasting (or sanding) and applying peel-plies to the surfaces of the composites. The peel-ply technique involves applying an adhesive film to the surface of a composite and then removing the film. The removal of the film is expected to remove the contaminants deposited on the surface of the composite material and also to refresh its surface.

One objective of both of these techniques is to remove contaminants (e.g., mold release agents), but also to increase the surface polarity, surface energy, and contact area of the adhesive/CFRP interface. Surface contamination in the form of mono-layer adsorbates may prevent adhesion at the adhesive/CFRP interface and induce adhesive failure. However, sandblasting is labor-intensive for large structures and exhibits two main areas of concern: the non-uniformity of the procedure and the inherent trade-off between (1) the full removal of contamination and (2) the possible damage of the surface fibers. The use of peel-ply minimizes the human error present in sandblasting. Moreover, the peel-ply is attractive from a manufacturing and quality assurance standpoint because it reduces manufacturing costs, ensures good reproducibility, is easy to apply, and protects the surface of the composite material during handling prior to bonding. However, the peel-ply-treated surface very often needs to be cleaned or activated.

Because aerospace applications require robust, repeatable, and reliable processes for joining together various materials, additional strategies have been devised through the years, e.g., wet chemical treatments and physical high-energy radiation treatments, such as plasma and laser processing. Photo-grafting and surface functionalization are commonly employed chemical treatments to enhance interfacial adhesion, promote covalent bonding, and improve the shear strength and fracture toughness of the joined composite materials.

However, similar to sandblasting, the chemical treatments may cause harm to the environment by producing large amounts of (hazardous) chemical waste. Moreover, the chemical treatment processes are difficult to automate in an industrial scenario. Modern high-energy radiation treatments provide an environmentally friendly alternative to wet chemical treatments. Plasma is a widely used process which has been proved to enhance the strength and fracture toughness of adhesively-bonded composite materials, especially after aging. However, plasma processing usually provides little or no modification to the surface morphology and does not enable mechanical interlocking of the mating substrates.

Recently, pulsed-laser irradiation gained attention because it is a fast and controllable technique, which can simultaneously modify the surface chemistry and morphology of the composite materials, and is suitable for large-scale applications. In particular, laser beams can be used to selectively remove target materials, including potential contaminants. Laser treatments also reduce the risks associated with manual processing, e.g., contamination and process variation.

Currently, there is no universally defined tool for applying laser ablation to composite materials for preparing them for adhesive-bonding. The pulsed laser systems operate at different pulse regimes with wavelengths varying from UV to IR, which causes different interactions with the target material. For applications on CFRPs, previous works focused on excimer ($\lambda=308$ μm), Nd-YAG ($\lambda=355$ nm), Yb-fiber ($\lambda=1064$ μm) and $CO_2$ lasers (mid-IR range, $\lambda=10.6$ μm). The different laser-CFRP interactions that can be realized with these lasers lead to large variations in the treated surfaces, from a simple surface cleaning, with little or no modification of the surface layers, to a full removal of the matrix of the layers with consequent exposure of carbon fibers. As a consequence, these surface treatments lead to very different fracture responses.

Thus, there is a need for a new process for treating the surfaces of the composite materials for adhesive-bonding.

SUMMARY

According to an embodiment, there is a method for bonding two elements. The method includes receiving first and second elements, the first element being a composite material; applying a laser-based treatment to a surface of the first element to obtain a treated surface; patterning the treated surface to have plural trenches; applying an adhesive to one of the first and second elements; and joining the first element to the second element so that the adhesive is between the first and second elements.

According to another embodiment, there is a joined element that includes a first element that includes a composite material having plural fibers; a second element, and an adhesive located between a surface of the first element and a surface of the second element. The surface of the first element is treated with a laser-based treatment to partially expose the fibers to obtain a treated surface and the treated surface is patterned to have plural trenches.

According to still another embodiment, there is an airplane joined element that includes a first element that includes a first composite material having first plural fibers; a second element that includes a second composite material having second plural fibers; and an adhesive located between a surface of the first element and a surface of the second element. The surface of the first element and the surface of the second element are exposed to a laser-based treatment to partially expose the fibers to obtain corresponding treated surfaces and the treated surfaces are patterned to have plural trenches.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 8A to 8D show scanning electron microscopy images of the fracture surfaces;

DETAILED DESCRIPTION

Figure 1:
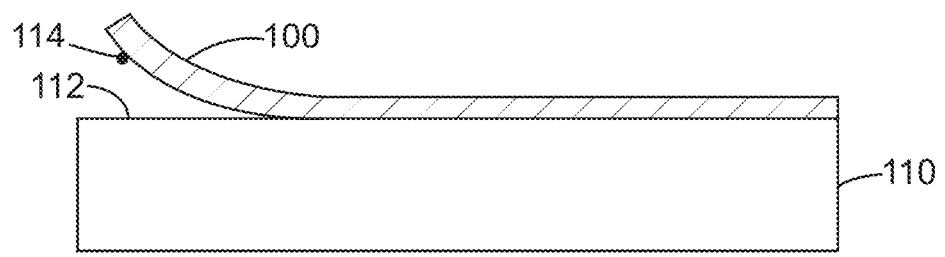
FIG. 1 illustrates the use of a peel-ply fabric on a given substrate for obtaining a fresh and activated surface.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to attaching two composite materials to each other and how to treat their surfaces prior to joining them. However, the invention is not limited to this scenario, but it may be used for joining other types of materials, for example, a composite material and a metallic material.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, in a quest to adhesively bond two composite materials with superior fracture properties, novel combinations of different homogeneous laser surface treatments are deployed to generate CFRP substrates with patterned interfaces. The effects of homogeneous (i.e., no pattern) laser irradiation pretreatments on the mode I fracture toughness of adhesively bonded composite materials are firstly evaluated in comparison with peel-ply and sandblasting pretreatments. A wide range of techniques, including X-ray photoelectron spectroscopy (XPS), contact profilometry, and optical and scanning electron microscopy (SEM) are used to ascertain the features of the pretreated CFRP interfaces. The corresponding fracture toughness are assessed through double cantilever beam (DCB) tests and the fracture surfaces are analyzed through both the optical microscopy and SEM.

Next, various materials and treatment methods applied to these materials prior to adhesive bonding them are discussed. The substrate materials are unidirectional carbon fiber pre-pregs (i.e., pre-impregnated composite fibers where a thermoset polymer matrix material, such as epoxy, is already present) composed of toughened epoxy resin and carbon fibers (e.g., HexPly T700/M21, Hexcel, Stamford, Conn., USA), with a nominal fiber volume of 57%, which represents an aerospace-grade composite material. Unidirectional laminates were fabricated by compression molding to work as substrates for adhesive bonding tests.

The curing cycle of the laminates was conducted as follows. First, a full vacuum (1 bar) was applied to every four-layer stacking in order to reduce air entrapment and void formation in the final laminate. Then, a gauge pressure (7 bar) was applied using a hydraulic hot press machine (e.g., Hydraulic presses, Pinette Emidecau Industries, Chalon-sur-Saone, France) at a heating rate of 3° C. per min and a hold time of 120 min at 180° C. Then, the laminate is cooled at a rate of 3° C. per min.

The adhesive selected for bonding the cured CFRP substrates is a two component, room-temperature curing epoxy (e.g., Araldite 420 A/B, Huntsman, Salt Lake City, Utah, USA). This epoxy is a structural adhesive with high shear and peel strengths for bonding materials such as metals, thermosets, and thermoplastics. The basic mechanical properties of the adhesive provided by the manufacturer and obtained through tensile tests are as follows: Young's modulus, E=1.5 GPa, elongation at break, $\epsilon_f$=4.6%, and tensile strength, $\sigma_f$=29 MPa.

The following surface treatments have been applied to the various materials. As illustrated in FIG. 1, a commercial polyamide (dry) peel-ply 100 (e.g., Diatex PA85, Diatex, Saint-Genis-Laval, France) was applied to a pre-preg stacking 110 to generate a standard surface condition for the subsequent comparative analyses. The peel-ply fabric 100, once removed from the surface 112 of the test material 110 (before bonding), should generate a fresh and activated surface by removing the excess resin 114 (some sizes of the shown elements are exaggerated for better illustration).

The peel-ply pretreatment of a composite material's surface is referred herein as PP treatment. An additional standard surface condition may be obtained by sandblasting (SB) the composite material for the subsequent comparative analyses. The SB treatment may be performed using a wet blaster (e.g., Hurricane, MBA, CA, USA). Pulsed laser irradiation (L) treatment of the composite material may be carried out using a 10.6 μm $CO_2$ laser (PLS6.75 Laser Platform, Universal Laser Systems, NY, USA). Different surface modifications of the target composite materials were attained by controlling selected laser processing parameters for the L treatment, e.g., the laser speed, average power, and pulse frequency.

Because CFRP substrates (called herein composite substrates) may be produced with different surface-resin contents and fiber orientations, an evaluation of the laser processing parameters is necessary. The main parameter guiding the efficiency of the L treatment is the pulse fluence ($F_p$) of the laser, which is given by:

$$F_p = I_p \cdot t_p = \frac{W_{ave}}{f \cdot A_s} = \frac{4W_{ave}}{v \cdot PPI \cdot \pi d^2}, \quad (1)$$

where $I_p$ represents the laser irradiance, $t_p$ is the laser pulse duration, f=v·PPI is the pulse frequency, $W_{ave}$ is the average pulse power, $A_s=\pi d^2/4$ is the spot size, v is the beam traveling speed, and PPI represents the number of pulses per inch. Preliminary investigations revealed that the ablation depth depended on the pulse fluence $F_p$ and frequency f.

The pulse fluence $F_p$ was elected as the controlling parameter of the ablation depth. Therefore, the average power of the laser beam was varied while the beam speed and number of laser pulses were kept constant at, for example, v=500 mm/s and PPI=1000, respectively. The focal distance was adjusted so that the resulting laser spot diameter was d=200 μm. With these parameters, a light surface "cleaning" of the composite material with minor modifications of the surface roughness was achieved at a pulse fluence of $F_p$=1.2 J/cm². This laser treatment of the composite material's surface, named herein L1 treatment, led to the ablation of the surface matrix and partially exposed the carbon fibers.

In addition, a laser beam with a higher pulse fluence, $F_p$=3.6 J/cm², was also used to fully expose the carbon fibers of the target composite material's surface. This treatment is referred herein as an L2 treatment. Nominally flat surfaces for the target composite material were obtained by covering the pre-pregs 110 with a Teflon film during the curing step. This baseline flat surface (due to the flat surface of the Teflon film) is referred herein as the T treatment. The surfaces obtained by PP, SB, L1, L2 and T treatments were degreased in an ultrasonic bath of acetone for 10 minutes, and then oven dried at 50° C. for 25 minutes before applying the adhesive (e.g., epoxy adhesive).

Next, a couple of investigative methods were applied to assess the quality of the joined materials, where the joined materials included composite materials treated with the PP, SB, L1 and L2 treatments discussed above. A first method used to evaluate the properties of the joints was the X-ray photoelectron spectroscopy (XPS).

XPS studies were carried out in a Kratos Axis Supra spectrometer (Amicus, Kratos Analytical Ltd, Manchester, UK) equipped with a monochromatic Al Ka X-ray source (hv=1486.6 eV) operating at 300 W, a multichannel plate and delay line detector in a vacuum of $10^{-9}$ mbar. All spectra were recorded using an aperture slot of 300 μm×700 μm. The survey spectra were collected using a pass energy of 160 eV and a step size of 1 eV. A pass energy of 20 eV and a step size of 0.1 eV were used for the high-resolution spectra. The composite material samples were mounted in a floating mode (i.e., free to move) in order to avoid differential charging. Charge neutralization was used for all samples. Binding energies were referenced to the sp2 hybridized (C=C) carbon for the C1s peak set at 284.5 eV from CFRP laminates. The data were analyzed on commercial software (CASAXPS, Casa Software Ltd, Devon, UK).

Another method used to characterize the surface of the target composite material includes surface profilometry and high-resolution imaging. Surface profiles were measured by contact profilometry (Dektak 150 Surface Profiler, Veeco, New York, USA) using a microscopic stylus tip (5 μm radius). A minimum of five scans were carried out parallel and perpendicular to the fiber direction of the composite material, featuring a gage length of 3 mm and a sampling resolution of 0.1667 μm/point. The arithmetical-average roughness $R_a$ of the surface of the target composite material is defined by equation (2), which was extracted from the obtained heights of the surface profile, where:

$$R_a = \frac{1}{n}\sum |y_i - y_{mean}|, \quad (2)$$

where n is the number of sampling points from each scan, $y_i$ is the height of the surface profile for point "i", and $y_{mean}$ is the average of all $y_i$ values. High resolution SEM imaging (Quanta 600, FEI, CA, USA) was also deployed with secondary electrons to resolve the morphological features generated by the various treatments.

Next, various tests were performed for determining the fracture toughness of the joined composite materials. Mode I fracture tests were carried out using a DCB configuration 200, illustrated in FIG. 2A, according to the procedures and recommendations reported in the ASTM D5528-13 standard. Two CFRP laminates 202 and 204 including parallel fibers (along direction X) were bonded to each other using an epoxy adhesive 210. A starter crack between the two laminates 202 and 204 was generated using a non-adhesive polyethylene insert 212 (e.g., 60 mm long and 80 μm thick). Copper wires (e.g., 100 μm diameter) were used as spacers to control the thickness of the adhesive layer.

Figure 2A:
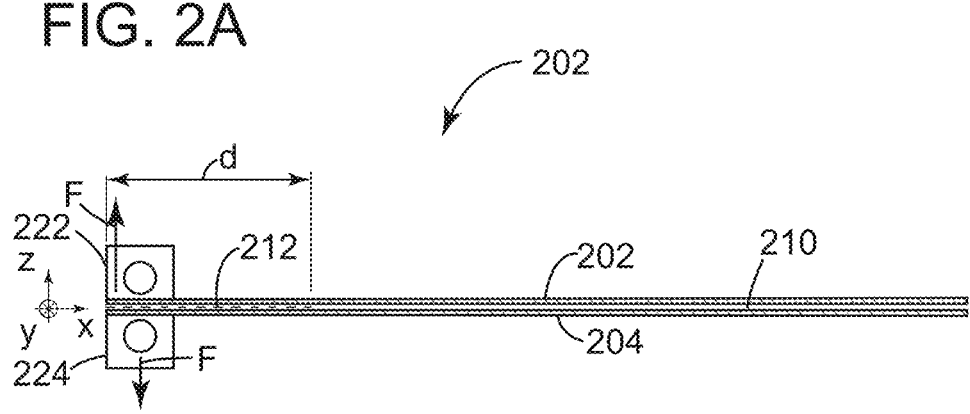
FIGS. 2A and 2B illustrate a double cantilever beam (DCB) test applied to a target material and the effect of various treatments applied to the target material.
Figure 2B:
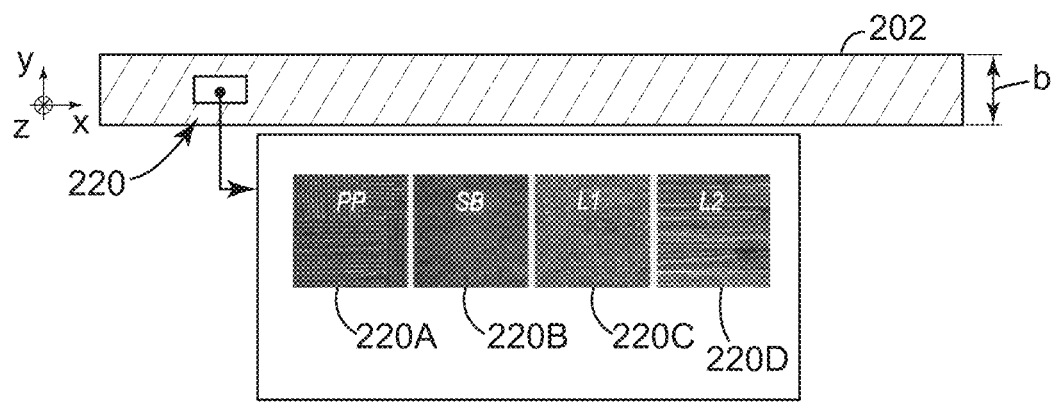

Mechanical pressure was applied during curing of the adhesive 210 to ensure full adhesive-CFRP contact and a consistent thickness of the adhesive layer. Epoxy hardening was performed over 12 hours in a temperature- and moisture-controlled laboratory environment, i.e., 22° C. and 71% R.H. The bonded plate was then cut into small specimens 220 (see FIG. 2B), for example, 250×20×4.1 mm³, and loading blocks 222 and 224 were bonded onto each specimen's arm to enable the application of the end peel loading force F, as illustrated in FIG. 2A. FIG. 2B also illustrates the investigated surface treatments of the various specimens, i.e., a polyamide peel-ply specimen (PP) 220A, a specimen 220B having a Teflon surface that was sandblasted (SB), a specimen 220C having a Teflon surface that was laser irradiated with a first fluence (L1), and a specimen 220D having a Teflon surface that was laser irradiated with a second fluence (L2).

Mechanical tests were carried out under displacement control at a rate of 5 mm/min using a universal testing machine (Instron 5882, Instron, Massachusetts, USA). Loading and unloading cycles were employed during tests to prevent unstable crack propagation. The tests continued until the opening displacement reached a given length δ, for example, 45 mm. The crack propagation was observed in situ using a high-resolution camera (Cannon EOS-1 Ds, resolution 5616×3744 pixels) and black thin lines were marked at every millimeter on the specimen edge for aiding in evaluating the crack propagation.

The mode I fracture toughness ($G_{Ic}$) was averaged over at least five tests for each surface pretreatment 220A to 220D. The compliance calibration (CC) method, suggested by the standard ASTM D5528-13, was used for the calculation of $G_{Ic}$:

$$G_{Ic} = \frac{nP\delta}{2ba}, \quad (3)$$

where P is the applied load, δ is the corresponding opening displacement, b is the specimen width, a is the crack length, and n is the CC term, which was extracted from experimental data by means of a least-square plot of the logarithmic compliance as a function of the logarithmic crack length, i.e., log(C)–log(a). Both the optical microscopy and SEM were used to probe the fracture surfaces and reveal the failure mechanisms.

Figure 3:
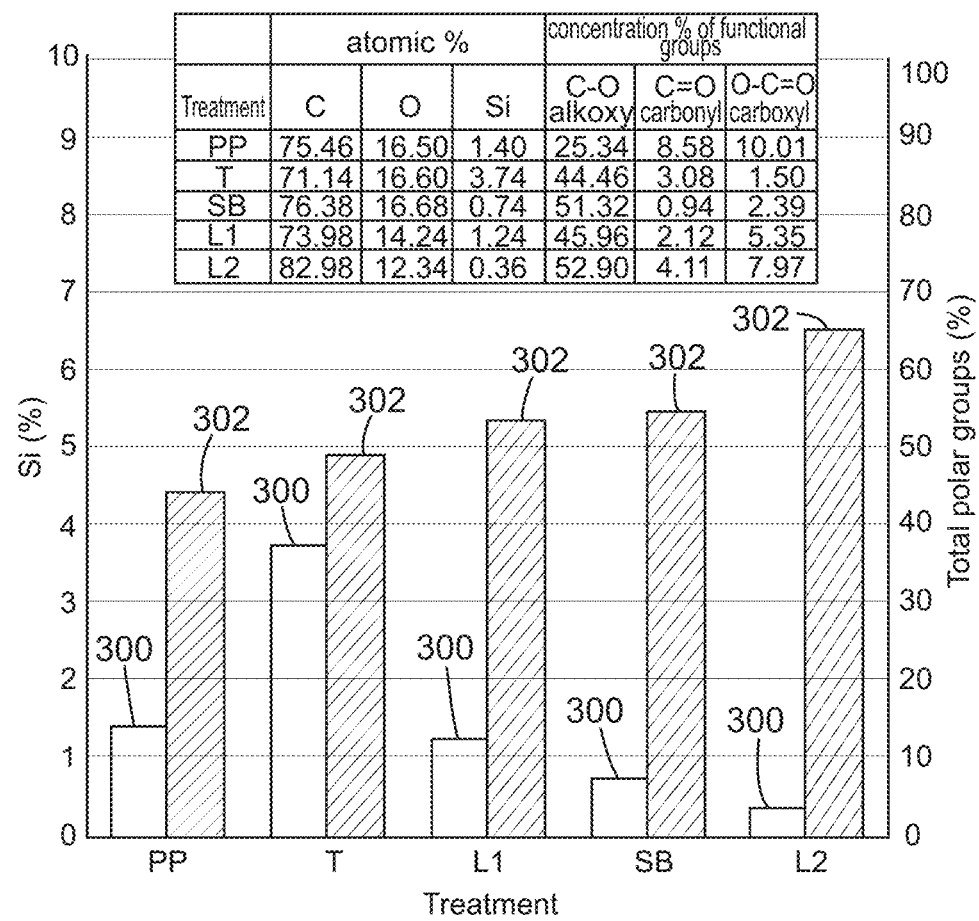
FIG. 3 illustrates the concentration of various elements and polar groups that are found on the surface of a target material prior to bonding.

The results of the tests are now discussed. Global XPS survey scans were performed, focusing on three main chemical elements: C, O and Si. The resulting average atomic concentration of chemical elements found on the surface of the target composite materials is shown in the insert of FIG. 3 as a function of the specific treatment applied to the surface. Fluorine (F) contamination was also detected, which could have been transferred from the Teflon film to the CFRP surface during curing; however, its atomic concentration was very limited (i.e., about 5%).

Silicon, which is a potential surface contaminant, was measured on all surfaces and all treatments, as illustrated by reference 300 in FIG. 3. It is believed that the silicon came from molding release compounds of the product employed in the experiments, or from the protective tape used to cover the surfaces. In this regard, small amounts of Si compounds are often added to pre-pregs as flame retardant, resulting in a baseline level of Si atomic concentration of about 0.4%.

It is known that the presence of Si may have a detrimental effect on the fracture toughness of adhesive/CFRP interfaces. High-resolution carbon peaks of C1s were assessed in the binding energy range from 277 to 304 eV to detect carbon-based surface functional groups 302. These groups and their concentration are listed in the insert of FIG. 3, where the concentration of functional groups was estimated from the area percentages of the fitted peaks from the C1s spectra. The following oxygen-containing groups were found: alkoxy (C—O), carbonyl (C=O), and carboxyl (O—C=O).

All of these groups are correlated with the improvement of surface energy and wettability. The total amount of polar groups is also listed in FIG. 3 as a function of the treatment applied to the target composite material. An overall analysis of the data indicated that, starting from the baseline condition T, both the mechanical (SB) and physical surface treatments (L) reduced the Si contamination and also increased the polar groups. The residual Si in the laser treated surfaces may have come from condensation during processing. However, in sandblasting, the process may have merely smeared the Si contamination from one area to the other. SB and L treatments performed better than a PP treatment in terms of contaminants removal and improved adhesive-CFRP interaction.

However, as will be shown later, the mechanical and physical surface modification strategies affected in totally different ways the surface topography and morphology of the target composite materials. Also, the atomic concentration of oxygen was reduced in the laser-treated samples with respect to the baseline T surfaces. However, as reported in literature, laser irradiation interacts with CFRP substrates mainly through photo-thermal reactions. Because of the low energy of the $CO_2$ laser photons, photo-chemical reactions are unlikely. Therefore, the reduction of oxygen could be due to the removal of hydroxyl groups. Despite the reduced oxygen, the concentration of polar groups increased with pulse fluence, which may enable increased surface wetting.

Figure 4:
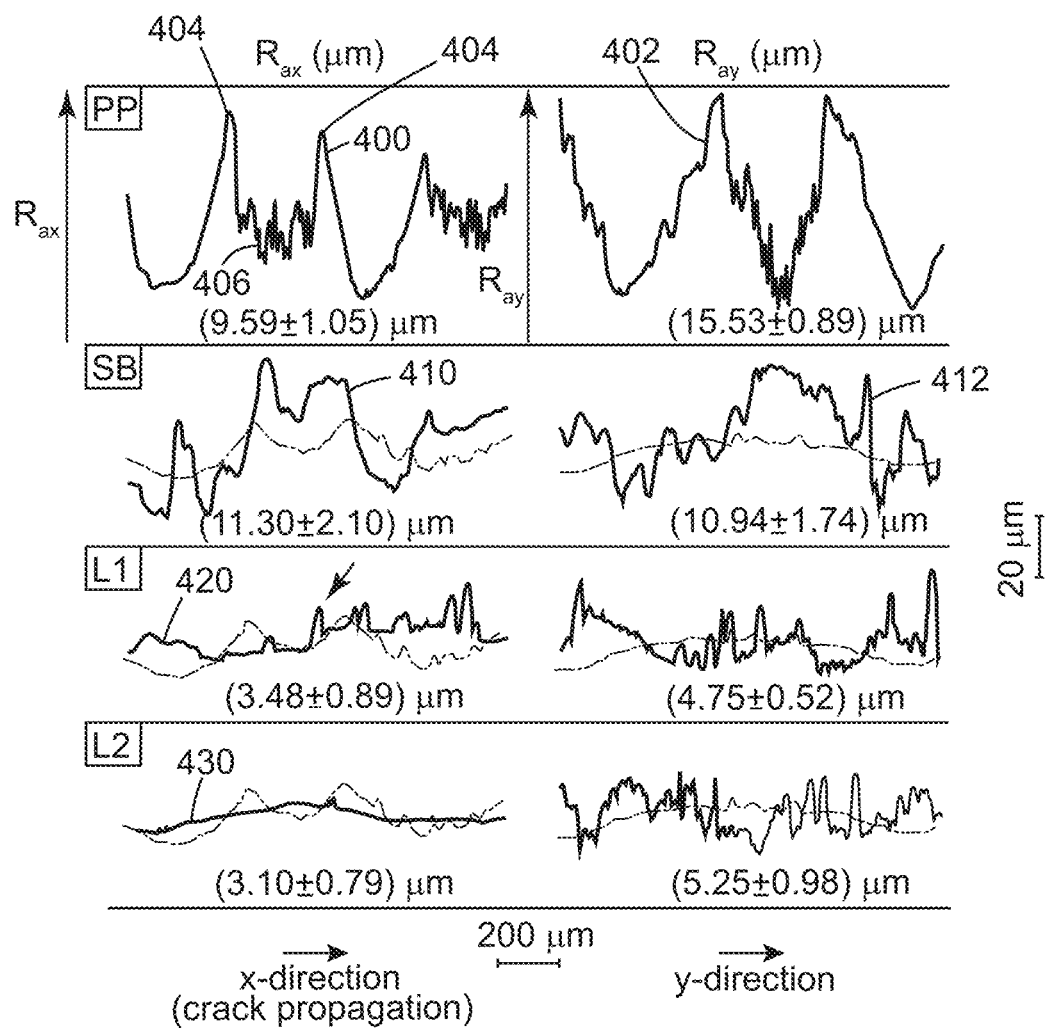
FIG. 4 illustrates profile scans and surface roughness for target materials that are treated according to different methods.

The surface topography and morphology of the target composite materials have also been studied. The profile scans and roughness of the treated surfaces are shown in FIG. 4, where the crack growth is along the x-direction. FIG. 4 shows the surface profile along the crack direction x and also along a perpendicular direction y. The PP profiles 400 and 402 show periodic profile peaks 404 and local high-frequency fluctuations 406. Because of the adhesive viscosity, microscopic asperities may be difficult to be filled, thereby preventing intimate molecular contact at the adhesive/CFRP interface.

The SB surfaces (see profiles 410 and 412) were comparably rough, but did not display high-frequency features. The sandblasting treatment largely increased the surface roughness, compared to the baseline T surfaces. Unlike the standard PP and SB treatments, the laser-treated surfaces displayed much lower roughness along the fiber direction (see profiles 420 and 430), especially at a higher fluence (L2), because the surface epoxy was removed and the carbon fibers were exposed. However, the profile scans can be distorted by the finite size of the scanning stylus tip (5 μm). The nominal radius of carbon fibers was 7 μm, and the gaps between the fully exposed fibers were even smaller. Note that FIG. 4 shows (with a dash line) the average surface roughness for the various treatments. The arrows point to the residual particles (left side of the figure) and to the partially exposed fibers (right side of the figure) on the L1 treated surface.

Figure 5:
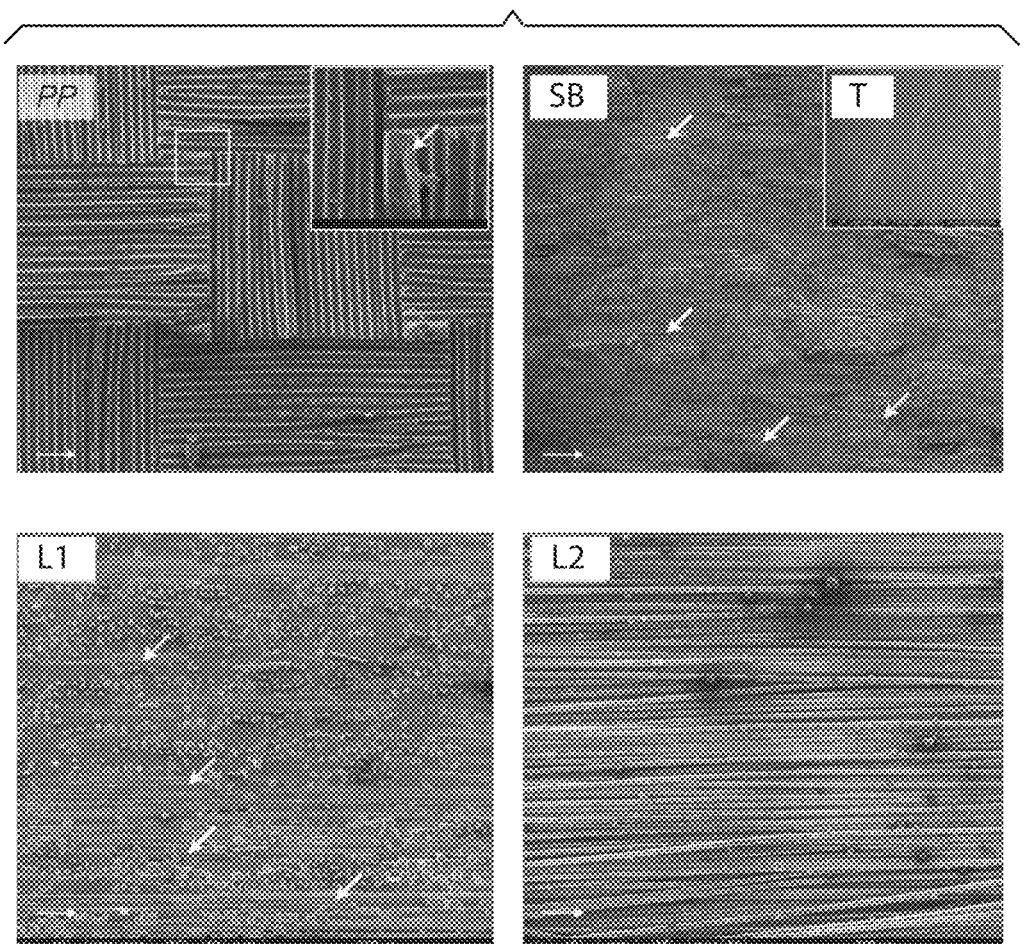
FIG. 5 shows the morphology of the surfaces for the target materials treated according to different methods.

High-resolution observations under SEM were performed on these target composite materials to obtain a qualitative assessment of induced morphological modifications, and images of the morphological modifications of the target materials are shown in FIG. 5. The removal of the peel-ply from the CFRP surface should have exposed fresh epoxy that would enable enhanced adhesive bonding. However, the SEM analyses indicated that the epoxy fracture was limited to the boundary of the imprinted peel-ply patches. The characteristics of the surface created by the peel-ply removal strongly depended on the interaction between the CFRP surface matrix and the dry peel-ply fabric during curing. The XPS scan results indicate that, although the texture induced by the peel-ply fabrics increased the surface roughness, the final CFRP surface featured residual silicon and a limited concentration of the functional groups. Therefore, the fracture of substrate surface epoxy was limited and the surface displayed poor adhesion as shown later in mechanical results, which is consistent with what is known in the art. The SB pretreatments resulted in rough surfaces, but several locations also featured damaged carbon fibers.

The L1 surfaces demonstrated partially exposed fibers and micro-scale residual particles, which may have represented products from the photo-thermal reactions induced by the laser irradiation. The residual particles produced isolated peaks in the surface profiles (see the arrow in the x-direction profile in FIG. 4), while the partially exposed fibers created high-frequency fluctuations (see the arrow in the y-direction in the profile in FIG. 4). The L2 surfaces featured fully exposed carbon fibers as a result of the higher pulse fluence (3.6 J/cm$^2$), which also led to a drastic reduction in $R_{ax}$, whereas $R_{ay}$ was very similar to that obtained for the L1 treated surfaces. The L2 treated surface featured loose fibers that could be easily detached.

Figure 6B:
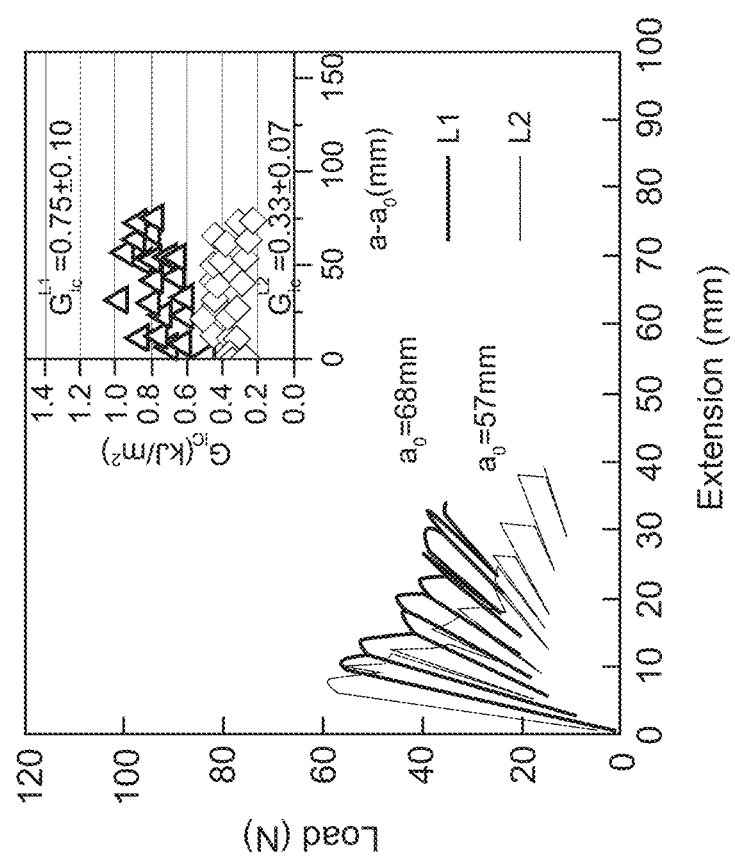
FIGS. 6A and 6B illustrate a global response of the target materials during DCB tests and the corresponding fracture toughness.
Figure 6A:
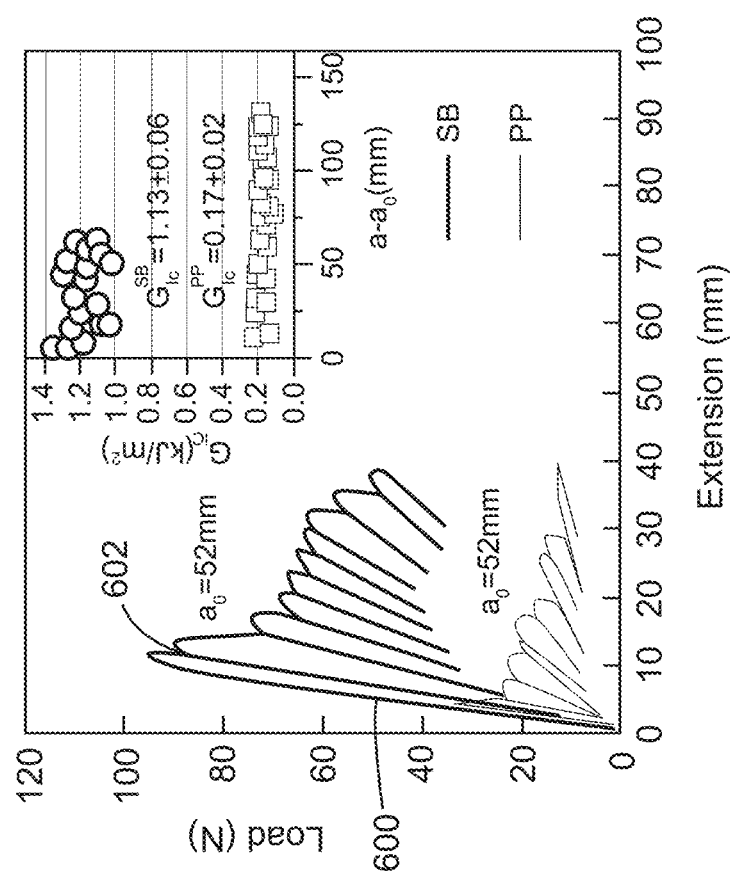

Regarding the fracture toughness, typical global responses recorded in DCB tests, which are illustrated in FIGS. 6A and 6B, consisted of an initial linear elastic region 600, corresponding to the bending of the beam with the initial crack length $a_0$, followed by a crack propagation region 602, which displayed a softening response. The resulting propagation fracture toughness, $G_{Ic}$, is given as a function of the crack length $a_0$ in the inserts of FIGS. 6A and 6B. The overall set of mechanical tests provided values of $G_{Ic}$ in the range of (0.2 to 1.4) kJ/m$^2$, which is consistent with adhesively bonded CFRP laminates known in the art. Calculation of the $G_{Ic}$ was not possible for the baseline T surfaces because brittle failure (unstable stick-slip with substantial load jumps) occurred in all tests. Thus, the flat T interface led to weak bonding and, for this reason, no results are shown for the T surfaces in FIGS. 6A and 6B.

From these results, it can be concluded that the standard PP and SB treatments defined the lower and upper bounds, respectively, of the mode I fracture toughness. For the applied opening displacement, the SB specimens featured a limited crack propagation compared to PP, thus indicating a stronger bonding and higher energy dissipation. The results obtained following the L1 and L2 treatments performed better than PP, but worse than SB, as illustrated in FIG. 6B. Moreover, increased scattering was also recorded because isolated sudden load drops occurred in the post-peak region, especially at the L2 interfaces due to fully exposed carbon fibers.

Figure 7C:
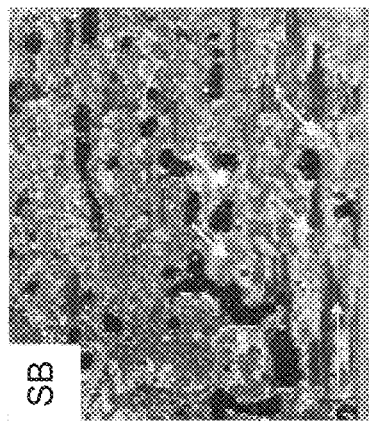
FIGS. 7A to 7E illustrate optical observations of fracture surfaces following the DCB tests.
Figure 7B:
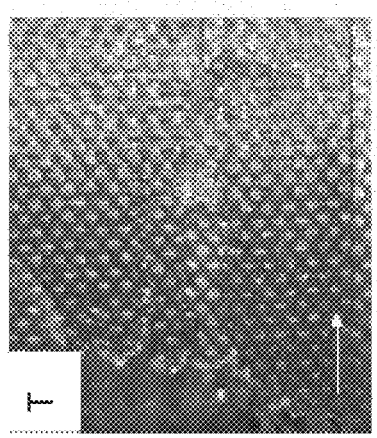
Figure 7A:
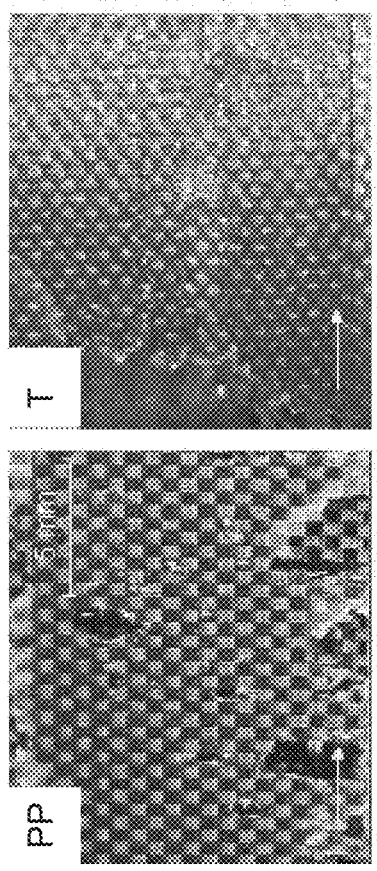

An analysis of the failure mechanisms in these samples was also performed. Optical microscopy and SEM imaging processes were used for this purpose. Optical microscopy was performed on the fracture surfaces to shed light on the results of mechanical tests, and the observations are summarized in FIGS. 7A to 7E, along with a summary plot of the fracture toughness against the atomic concentration of Si in FIG. 7F. The observed interfacial failure of the PP and T specimens (see FIGS. 7A and 7B), which featured the highest atomic concentration of Si and the smallest amount of polar groups, was caused by the weak adhesive-substrate interactions. Moreover, the T surface had very low roughness and was less amenable to mechanical interlocking. This explains the immediate failure and low resistance to crack growth that were observed. The PP surfaces were much rougher and resisted debonding well, leading to an enhanced toughness, $G_{Ic}^{PP}$=0.17±0.02 kJ/m$^2$. Yet, the PP surfaces were the least tough of all the probed surface targets. The low fracture toughness probably originated from the chemistry of the PP surfaces, which could have been affected by the peel-ply material and the release agent used to facilitate its removal after curing.

The SB surfaces (see FIG. 7C) displayed the highest fracture toughness, i.e., $$G_{Ic}^{SB} = 1.13 \pm 0.06 \frac{kJ}{m^2}.$$

More energy was absorbed with respect to the previous cases (PP and T) as verified by the observed stress "withening," which corresponded to a large adhesive deformation.

The laser-treated surfaces L1 and L2 (see FIGS. 7D and 7E), provided distinct mechanical responses. A similar mechanism as the SB surfaces was observed in the L1 specimens, which also demonstrated the high fracture toughness, i.e., $$G_{Ic}^{L1} = 0.75 \pm 0.10 \frac{kJ}{m^2}.$$

On the other hand, the L2 specimen featured a relative low fracture toughness, i.e., $$G_{Ic}^{L2} = 0.33 \pm 0.17 \frac{kJ}{m^2}.$$

Optical observations of the L2 fracture surfaces also indicated the occurrence of failure at the adhesive/fiber interface. Moreover, areas of imperfect wetting and adhesive penetration were observed, which are indicated by arrows in FIG. 7E.

Figure 7F:
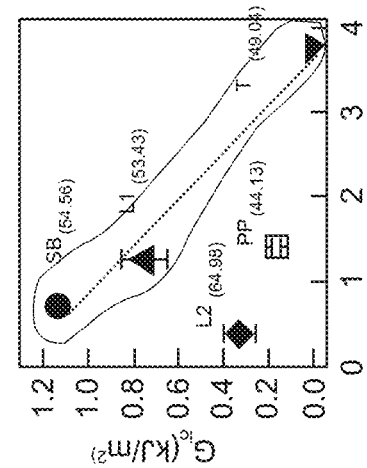
FIG. 7F illustrates a correlation between the atomic concentration of the silicone element and the fracture toughness.
Figure 7E:
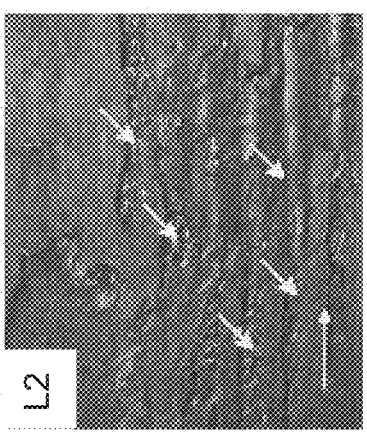
Figure 7D:
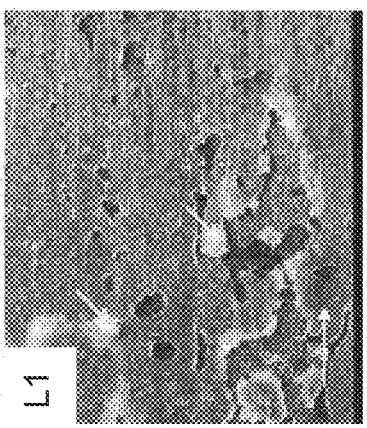

For the T, L1, and SB specimen surfaces, the fracture toughness scaled with the atomic concentration of Si. These surfaces can be compared because they involve the presence of an epoxy or a mixture of epoxy and exposed fibers, while the L2 specimen surface has a different morphology as previously noted and as illustrated in FIG. 7E. FIG. 7F also shows the concentration of total polar functional groups. In all the figures, the crack propagation is from left to right.

Secondary electron imaging was carried out using SEM to resolve the details of the failure process and the results of this investigation are illustrated in FIGS. 8A to 8D. Consistent with the optical observations, the PP surfaces (see FIG. 8A) experienced interfacial failure, with limited cohesive failure occurring mainly at the boundary of the imprinted peel-ply patches. This suggests a detrimental effect of the peel-ply on the surface to be bonded. As a result, the functional groups of the uncured pre-preg made contact with the low energy surface of the peel-ply fabric and, consequently, a similar peel-ply texture with low surface energy was also generated on the resin side (i.e., bonding surface). The SB fracture surfaces (see FIG. 8B) revealed the occurrence of cohesive failure, and surface damage in the form of broken carbon fibers from the sandblasting process. Some adhesive porosity, probably originating from the high roughness of the substrate and the resulting entrapped air, was also observed.

Laser irradiation with a low fluence of specimen L1 (see FIG. 8C) led to improved adhesion at the adhesive/CFRP interface and some degree of cohesive failure, as indicated by the arrows in FIG. 8C. There were a few broken fibers because the treatment led to only partial fiber exposure. An analysis of the L2 surface specimens (see FIG. 8D) indicated that, because the polymer resin was removed, the surface fibers were isolated from the bulk material. Thus, the crack path was diverted to the adhesive/fiber interface. The weak response is believed to be the result of the poor penetration of the liquid adhesive within fibers and the relative ease with which the loose surface fibers could be detached from the substrate. To enhance the adhesive penetration, an additional batch of specimens was fabricated, where the applied pressure during curing was increased from 0.075 bar to 1 bar. However, the results of this new batch did not display a significant improvement in the fracture toughness, since the differences with respect to the previous batch were within the range of experimental uncertainty. Therefore, the poor wetting of the specific liquid adhesive on the carbon fibers led to the low value of fracture toughness.

Figure 9A:
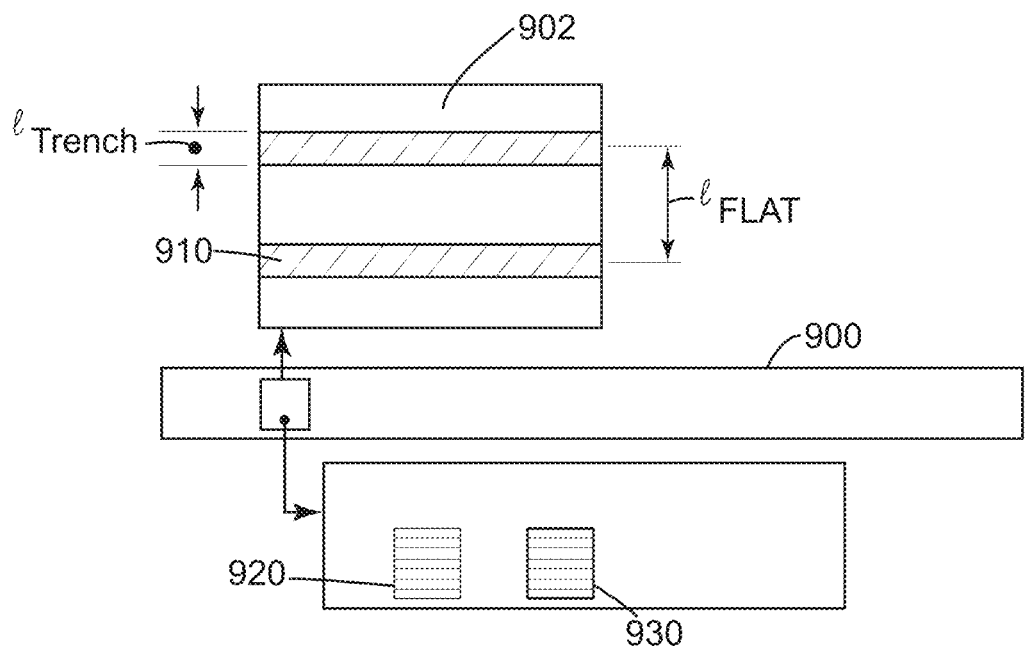
FIGS. 9A to 9B show patterned surfaces of target materials treated according to different methods.

According to an embodiment, the T and L1 treated surfaces are further treated by being patterned prior to being adhered to corresponding mating surfaces. Two laser-based patterning strategies were developed, in order to roughen the adhesive/CFRP interface, increase the contact area, and promote mechanical interlocking. The two treatments feature the same pulse fluence, (e.g., $F_p=9.1$ J/cm$^2$, but other values may be used) for creating surface trenches parallel to the fiber orientation (x-direction). FIG. 9A shows a target composite material 900 shaped as a strip. A surface 902 of the composite material 900 is patterned with a laser to have plural trenches 910, each trench having a width $I_{trench}$ and a center-to-center distance between two adjacent trenches being $I_{flat}$.

Figure 9B:
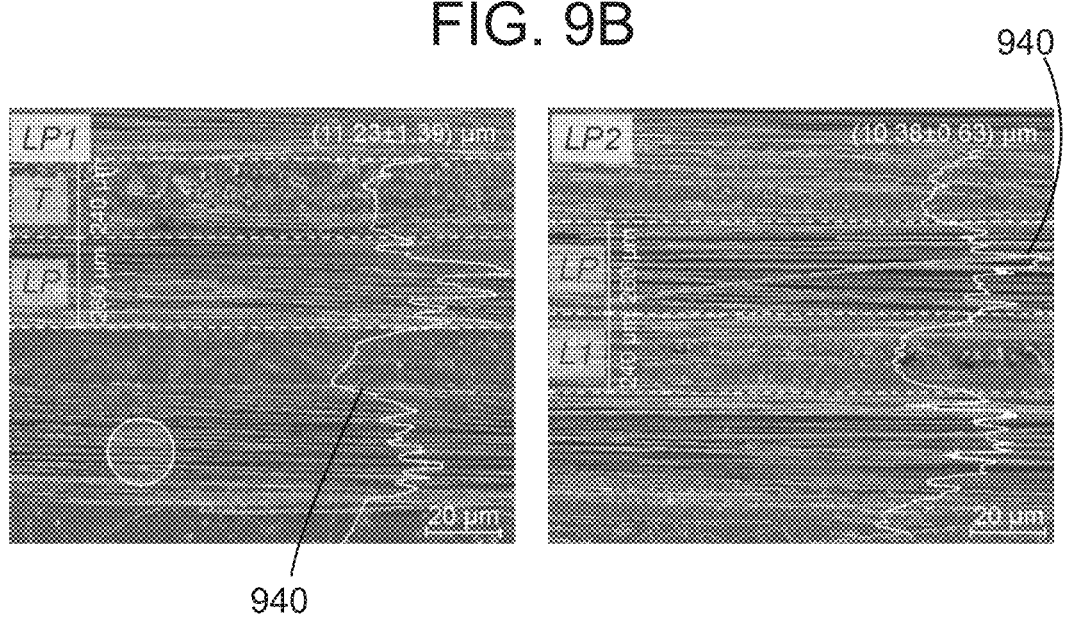

FIG. 9B shows a first pattern LP1 920 made on a baseline T surface and a second pattern LP2 930 made on an L1 surface. The L1 surface provided a better mechanical response in terms of the fracture toughness. In one application, the centerline-to-centerline spacing between two adjacent trenches was constant, at 500 μm. SEM observations of the surface morphology of the LP1 and LP2 patterns are illustrated in FIG. 9B. The profile scans 940 along the y-direction were overlapped with the corresponding SEM images to resolve the surface topography in the direction perpendicular to the crack propagation. This combined analysis shows that, due to the thermal interaction between the pulsed laser irradiation and the epoxy resin, the actual trench width was 260 μm, slightly larger than the spot size, and the depth was bell-shaped. Surface conditions within the trench were similar to those of the L2 surfaces, but the higher pulse fluence allowed deeper trenches to be obtained in a single pass with limited fiber damage. Fully exposed fibers in the trenches may have provided additional toughening in the form of fiber bridging.

Figure 10A:
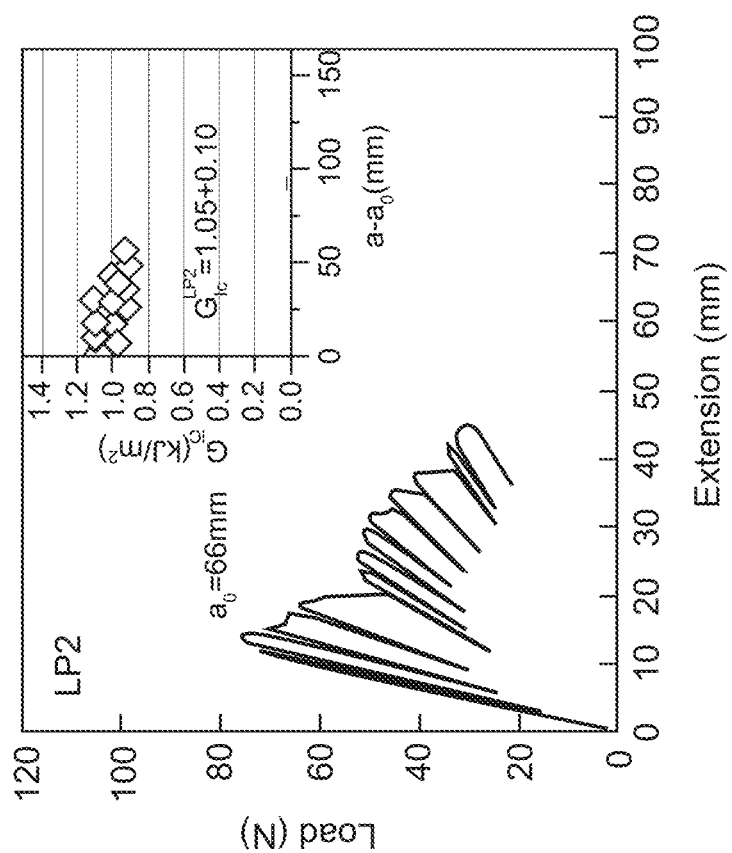
FIGS. 10A and 10B show the load responses recorded during the DCB tests and the corresponding fracture toughness.
Figure 10B:
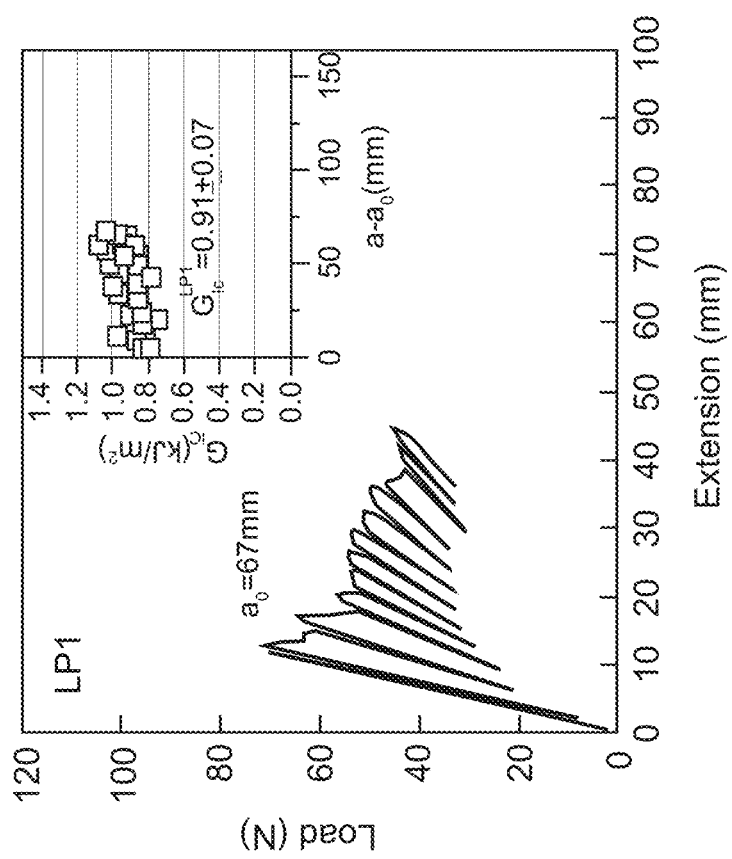

The global responses recorded during the DCB tests and the resulting propagation fracture toughness for the new patterned treatments LP1 and LP2 are illustrated in FIGS. 10A and 10B. It is noted that the laser patterning improved the fracture toughness, which reached almost the same level as the SB surfaces $$\left(G_{Ic}^{SB} = 1.13 \pm 0.06 \frac{kJ}{m^2}\right).$$

The improvement may be associated with the mechanisms of crack growth and failure across the patterned interfaces. In situ optical observations of the crack propagation for the new patterned treatments LP1 and LP2 were carried out using a high-resolution camera and an industrial endoscope (CMOS Omnivision OV6946, Precision Optics Corporation Inc., MA, USA) with 400×400 pixels resolution.

Figure 11A:
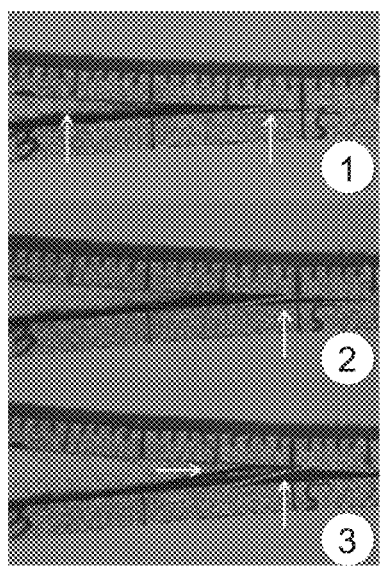
FIGS. 11A and 11B show in situ observation images of crack propagation for a patterned surface.
Figure 11B:

SEM imaging of the fractured surfaces was also performed. These observations are provided in FIGS. 11A and 11B. FIG. 11A shows the various stages of crack propagation in one LP1 specimen. At stage 1, bridging fibers are visible in the wake of the crack, as well as an adhesive ligament developed following the adhesive debonding (see arrows). At stage 2, some broken fibers (see arrows) are observed, while the size of the adhesive ligament is further increased. As the debonding progresses to stage 3, more fibers are seen (see arrows) and new adhesive ligaments are formed as others are broken. Images of the crack wake are shown in FIG. 11B and they were captured through an endoscope. This image confirms the above observations and show multiple instances of broken (downward arrows) and unbroken (upward arrow) adhesive ligaments. Note that FIG. 11B shows at the top one specimen and at the bottom another specimen that were bonded together with an adhesive and then a crack was induced at the joining surface. The stress "whitening" due to the severe deformation of the epoxy and isolated bridging fibers are also shown.

Overall, the fracture surfaces for the LP1 and LP2 treatments are quite rough and feature several broken ligaments, which appear to have some orientation toward the direction of crack propagation. The failure process may have contributed to the enhanced fracture toughness.

Figure 12A:
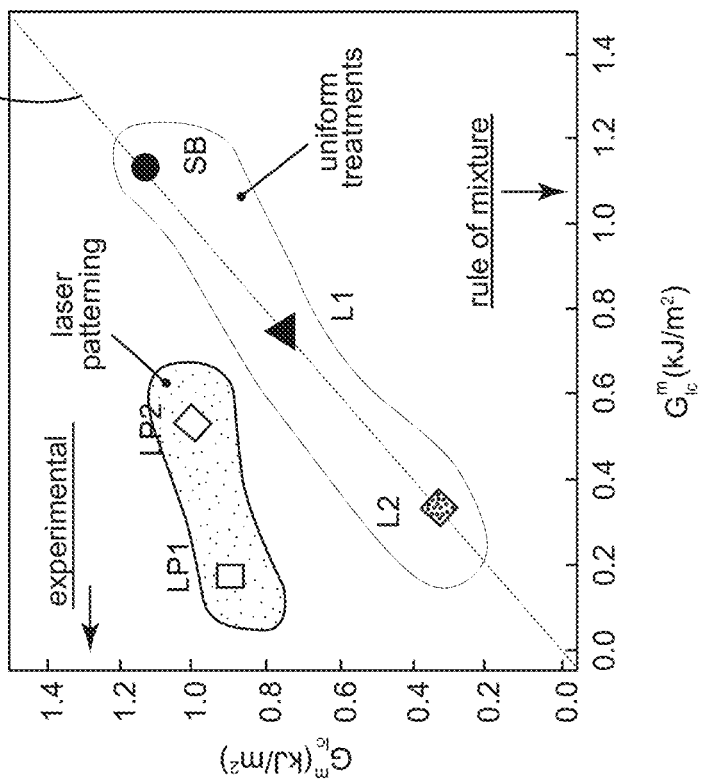
FIG. 12A shows a profile of a patterned surface and FIG. 12B shows experimental versus predicted values for the fracture toughness for target materials treated according to different methods.

The experimental mode I fracture toughness discussed in an earlier embodiment for the uniform surface treatments PP, SB, L1 and L2 was used in conjunction with the area fraction of the treated materials to obtain the toughness $G_{Ic}$ of the patterned interfaces LP1 and LP2. The basic rule of mixture, which is a weighted mean function, can be used to predict various properties of a composite material made up of continuous and unidirectional fibers. According to this rule, the overall toughness $G_{Ic}$ characterizing two different regions of the composite material is given by:

$$G_{Ic}^m = G_{Ic}^1 \varphi_1 + G_{Ic}^1 \varphi_2, \quad (4)$$

where $G^1_{Ic}$ and $G^2_{Ic}$ are the fracture toughness of two surfaces 1200 and 1202 of the two regions, respectively, and $\varphi_1$ and $\varphi_2$ are the corresponding area fractions. The two regions include a first region 1210 that has no trenches and a second region 1220 that has a trench 1222. The width of the first region 1210 is $I_{flat}$ while the width of the second region 1220 is $I_{trench}$. In this example, $I_{flat}$ is 240 μm and $I_{trench}$ is 260 μm. Because the trenches were developed along the x-direction, the ratio of the lengths of the different regions (shown in the cross-view schematic) gave the area fraction. FIG. 12A also shows the exposed fibers 1226 inside the trench 1222.

Based on the surface profile shown in FIG. 12A, the depth d of the trench 1222 is about 50 μm and the width $I_{trench}$ of the trench is about 260 μm. Therefore, assuming an arc shape for the trench 1222, as shown in FIG. 12A, the corresponding length $I_{arc}$ of the arc is estimated to be 285 μm. If this length is combined with the width of the "flat" region 1210, $I_{flat}$=240 μm, the area fraction of the trench can be calculated as being $\varphi = I_{arc}/(I_{arc}+I_{flat})$=54.3%.

Figure 12B:
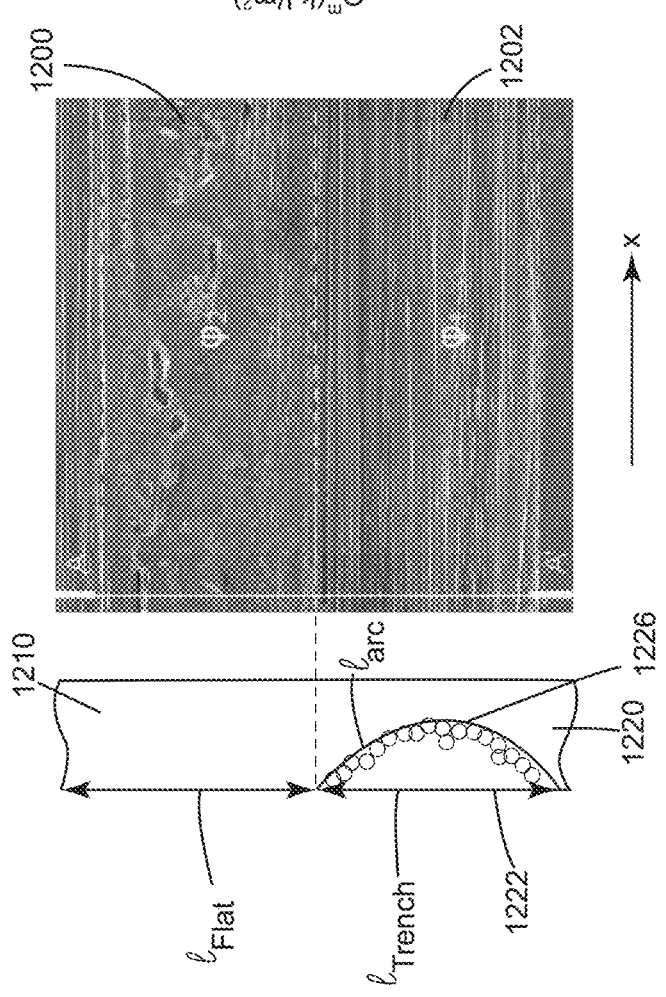

It is reasonable to assume that the fracture toughness of the trench region 1220 is the same as that of the L2 surface and the fracture toughness of the flat region 1210 is the same as that of the T surface. Therefore, by applying the law of mixture to the LP1 surface in FIG. 12A, the fracture toughness can be calculated using $G_{Ic}^{1}=G_{Ic}^{L2}$, $\varphi_1$=54.3%, $G_{Ic}^{2}=G_{Ic}^{T}$, $\varphi_1$=45.7% and the fracture toughness for the LP2 surface can be calculated by using $G_{Ic}^{1}=G_{Ic}^{L2}$, $\varphi_1$=54.3%, $G_{Ic}^{2}=G_{Ic}^{L1}$, $\varphi_1$=45.7%. The results of these calculations are illustrated in FIG. 12B. FIG. 12B plots the experimental values of the fracture toughness (on the Y axis) versus the corresponding predictions obtained using the rule of mixture (on the X axis).

As shown in FIG. 12B, the L2, L1 and SB treated surfaces' toughness fit on the dashed line 1250 as these treated surfaces were uniform pretreatments. Note that the dashed line 1250 is a straight line and the traditional law of mixture is a linear relation, i.e., it predicts that the toughness of a mixture of the materials would fit on a linear curve. Contrary to this traditional belief, the patterned surfaces LP1 and LP2 deviate from the law-of-mixture prediction, achieving a higher toughness than the linear combination and a similar performance as sandblasting.

The significant enhancement of the experimental fracture toughness for the patterned treatment surfaces LP1 and LP2 compared to the law-of-mixture prediction may be attributed to several factors. First, a very rough $R_{ay}$ is conducive to mechanical interlocking across the crack propagation direction. Second, the detachment of the adhesive layers within the trench-shape region enhanced energy dissipation through friction. Finally, loose fibers weakened the interface, but also promoted fiber bridging and the formation of adhesive ligaments.

However, the improvement of the fracture toughness from LP1 surfaces to LP2 surfaces was not significant, although $G_{Ic}^{T}$ was much lower than $G_{Ic}^{L1}$. Considering the similar failure behavior involving bridging fibers and adhesive ligaments, it is reasonable to conclude that patterning has played an important role in interfacial toughening.

Thus, the effects of surface pretreatments using pulsed laser irradiation on mode I fracture toughness of adhesively bonded composite materials are advantageous over the existing treatments. The mechanical behavior of these joints was assessed through DCB tests. The confluence of damage mechanisms in the laser patterned surfaces, not normally observed in homogeneous interfaces, allowed the fracture toughness to exceed the predictions based on a simple rule of mixture. The large interfacial area associated with the trench-shaped patterns effectively detected the cracks and generated extrinsic mechanisms of energy dissipation, such as toughening by unbroken fibers and uncracked ligaments. Fiber bridging and adhesive ligaments provided nonlinear deformation mechanisms which allowed the inherently brittle interface to deform inelastically, redistribute the stresses around defects, and dissipate energy. The discussed embodiment can be customized for different composites applied to the aerospace industry due to the high precision, reproducibility, and potential automation of the pulsed laser irradiation system.

Figure 13A:
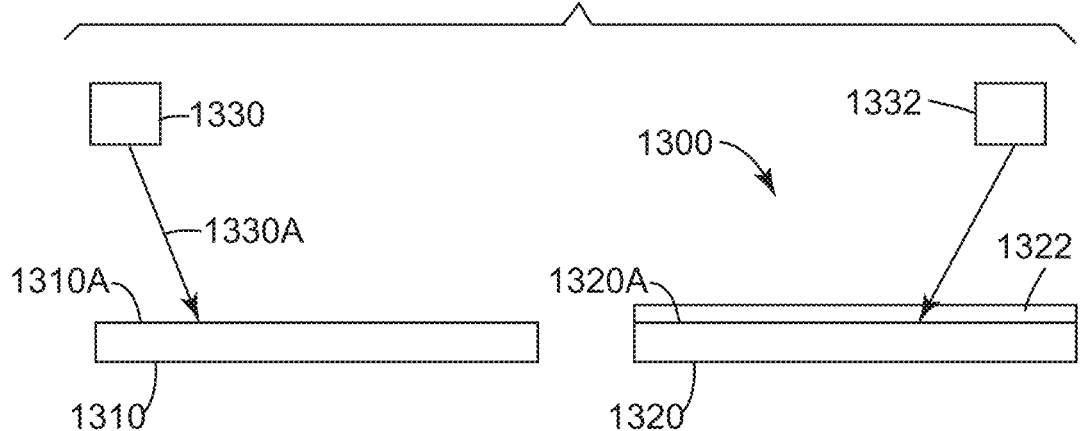
FIGS. 13A to 13D illustrate a process for joining two surfaces where at least one surface is patterned.
Figure 14:
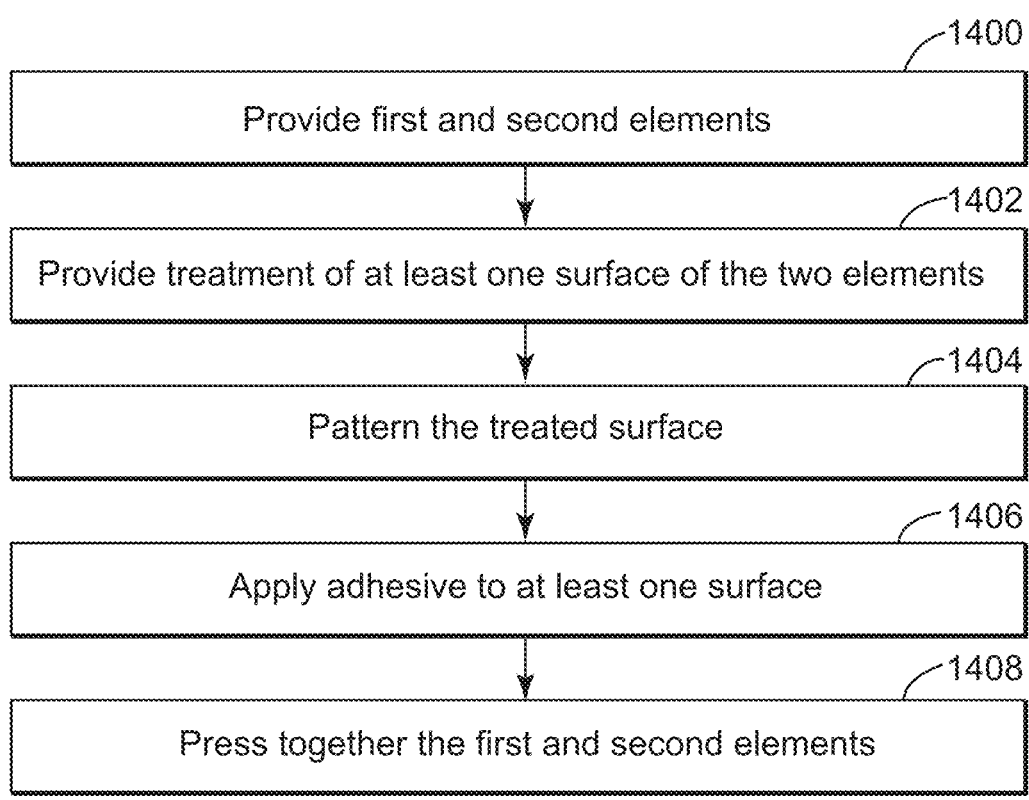
FIG. 14 is a flowchart of a method for bonding two surfaces to each other with an adhesive.

An application of the LP1 and/or LP2 surface treatments is now discussed. More specifically, FIG. 13A shows a system 1300 for joining first and second elements 1310 and 1320 and FIG. 14 illustrates a method for joining these two elements. The system 1300 includes at least one laser device 1330. FIG. 13A shows two laser devices 1330 and 1332, which are provided in step 1400 of the method. One skilled in the art would understand that only one laser device is necessary for this method, but two or more laser devices can be used for enhanced efficiency. The first and second elements, after being joined together, will form a wing of an airplane, a fan of a jet engine, a tail cone, or other part of the fuselage of an airplane. Those skilled in the art would understand that a method of joining the two elements 1310 and 1320 may also be used in other fields, e.g., general transportation, oil and gas, etc. In one application, the two elements 1310 and 1320 are made of composite materials. While the two elements may be made of the same composite materials, in still another application, the two elements can be made of different composite materials. In yet another application, only one element is formed of a composite material while the other element is formed of a plastic, wood, metal, glass, ceramic, or another non composite material.

In step 1402, the laser device 1330 may be used to irradiate a surface 1310A of the first element 1310 with a beam 1330A for applying a desired treatment. The treatment may be, for example, the L1 treatment. Alternatively, a T treatment is applied to the surface (see layer 1322 applied to surface 1320A of the second element 1320), i.e., a thin flat film (e.g., a Teflon layer) is applied to the top surface of the element for obtaining a flat surface. Note that there is not necessary to treat both surfaces of the first and second elements. In other words, at least one of the surfaces of the two elements is treated. However, for improved toughness, both surfaces can be treated. In one application, one surface is L1 treated and the other one is not treated. In another application, both surfaces are L1 treated. In still another application, one surface is L1 treated and the other one is T treated. Other combinations may be used.

Figure 13B:
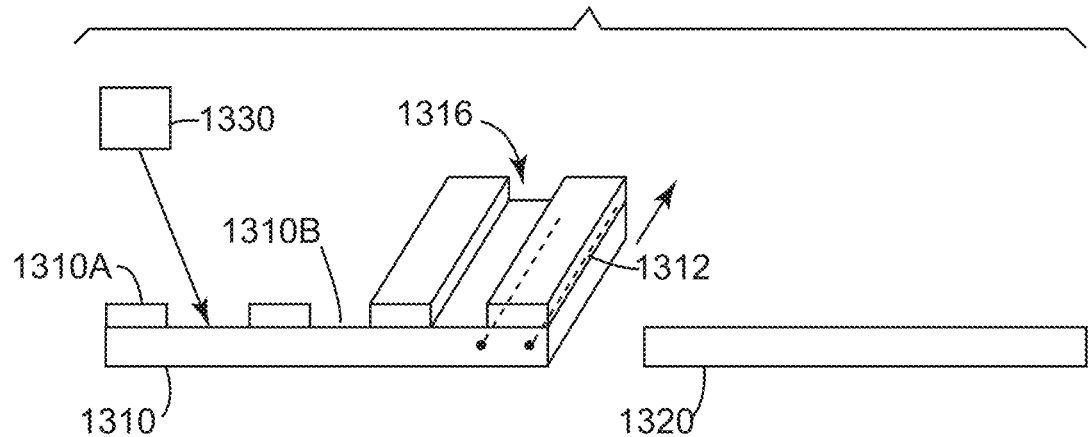

In step 1404, the same laser device 1330, or another one, may be used to pattern the surface 1310A of the first element 1310 (see FIG. 13B). Note that the surface that is patterned has been previously process with a T or L1 treatment. The pattern 1316 may include parallel trenches as illustrated in FIG. 9A. It is preferable that the trenches 1310B extend along the fibers 1312 of the composite material. Note that in this embodiment, the fibers are made to extend along the x-axis, i.e., substantially along the same direction. The dimensions of the trenches (width and depth) and the density of the trench are selected so that the fractional areas noted in equation (4) enhance the toughness of the resulting joint. In one application, the width and depth of the trenches and the distance between two adjacent trenches is in the order of micrometers. In one application, the trenches form a non-zero angle with the fibers, i.e., with the x-direction. This non-zero angle may be as large as 45°.

Figure 13C:
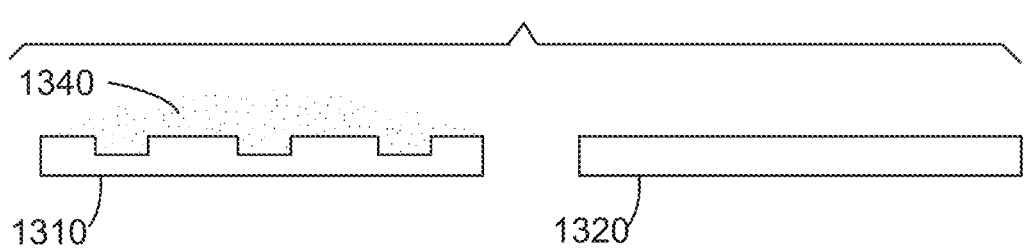
Figure 13D:
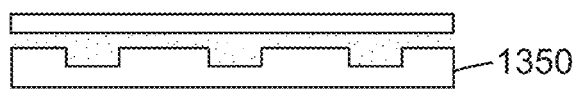

In step 1406, an adhesive 1340 (see FIG. 13C) is placed on at least one of the surfaces of the first and second elements 1310 or 1320, or both. The adhesive may be any bonding adhesive. In step 1408, the first and second elements are pressed together to form an adhesive bond. After a certain curing time, the two elements have been joined together and can be used as a single element 1350 (see FIG. 13D).

The disclosed embodiments provide methods and devices that treat a surface of a material prior to being adhesively bonded to another material to enhance the toughness of the bond. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for bonding comprising:
   receiving first and second elements, the first element being a composite material that includes plural fibers;
   applying a laser-based treatment to a surface of the first element to obtain a treated surface, which partially exposes a set of fibers of the plural fibers without forming trenches in the surface;
   patterning the treated surface using another laser-based treatment, to make plural trenches, which fully expose a subset of the set of fibers while remaining fibers of the set of fibers remain partially exposed on the treated surface, wherein the plural trenches extend along the plural fibers;
   applying an adhesive to one of the first and second elements; and
   joining the first element to the second element so that the adhesive is between the first and second elements,
   wherein a mode I fracture toughness of the joined first and second elements is higher than a linear combination of (1) a mode I fracture toughness of the first element and (2) a mode I fracture toughness of the second element due to the laser-based treatment, the another laser-based treatment and an orientation of the plural trenches.

2. The method of claim 1, wherein a toughness of the joined first and second elements does not follow a rule of mixture, which is a linear relation.

3. The method of claim 1, wherein a measured toughness of the joined first and second elements is higher than a prediction of a rule of mixture, which is a linear relation.

4. The method of claim 1, wherein the laser-based treatment comprises:
   irradiating with a laser beam the surface to ablate a surface matrix and partially expose carbon fibers making up the first element.

5. The method of claim 4, wherein a laser fluence is smaller than 10 J/cm2.

6. The method of claim 1, wherein the patterning step comprises:
   forming trenches into the surface of the first element.

7. The method of claim 6, wherein the trenches are parallel to each other.

8. The method of claim 7, wherein the trenches are parallel to carbon fibers making up the first element.

9. The method of claim 6, wherein a width of a trench is in the order of micrometers and a distance between adjacent trenches is in the order of micrometers.

10. The method of claim 6, wherein a width of the trench is the same with a distance between adjacent trenches.

11. The method of claim 6, wherein a width of the trenches is about 250 μm.

12. The method of claim 11, wherein a depth of the trench is about 50 μm.

13. The method of claim 1, further comprising:
    applying the laser-based treatment to a surface of the second element; and
    patterning the surface of the second element to have other plural trenches.

* * * * *